United States Patent [19]
Parker

[11] 3,946,903
[45] Mar. 30, 1976

[54] COLLAPSIBLE, SPIRALLY FLUTED CONTAINER

[76] Inventor: Carol Parker, 355 H Ave., Coronado, Calif. 92118

[22] Filed: June 25, 1974

[21] Appl. No.: 483,011

Related U.S. Application Data

[63] Continuation-in-part of Ser. No. 167,715, July 30, 1971, Pat. No. 3,819,789, which is a continuation-in-part of Ser. No. 832,257, June 11, 1969, abandoned.

[52] U.S. Cl. .................................................. 222/92
[51] Int. Cl.² ........................................ B65D 35/08
[58] Field of Search ............... 222/92, 215, 104, 107

[56] References Cited
UNITED STATES PATENTS

| | | | |
|---|---|---|---|
| 2,723,779 | 11/1955 | Parker et al. .................. | 222/107 X |
| 3,155,281 | 11/1964 | Stracey ............................. | 222/107 |
| 3,295,725 | 1/1967 | Brandt ............................... | 222/107 |
| 3,390,821 | 7/1968 | Mullan .......................... | 222/215 X |
| 3,740,306 | 6/1973 | Kosbab et al. ................. | 222/107 X |

*Primary Examiner*—Drayton E. Hoffman
*Assistant Examiner*—Norman L. Stack, Jr.
*Attorney, Agent, or Firm*—Edwin E. Greigg

[57] ABSTRACT

A container made of flexible, resilient material such as polyethylene has a wall formed into plural spirally extending flutes. The bottom of the container has an integrally formed inwardly directed cup-shaped protuberance for substantially completely expelling the contents when the container is collapsed. The spiral angle of the flutes is preferably 30° and the flutes are inwardly directed and unobstructed at the top dispensing opening.

4 Claims, 7 Drawing Figures

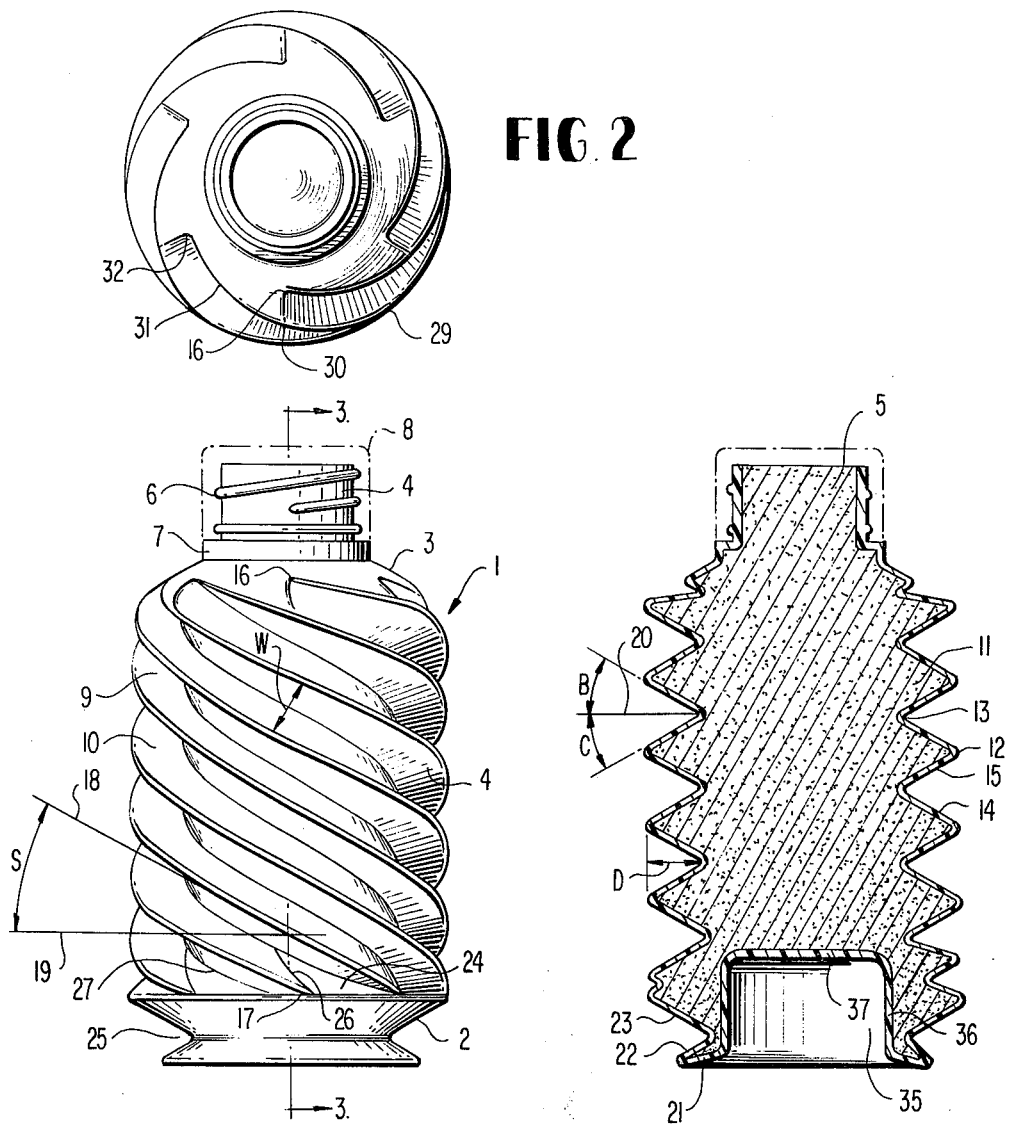

FIG. 4
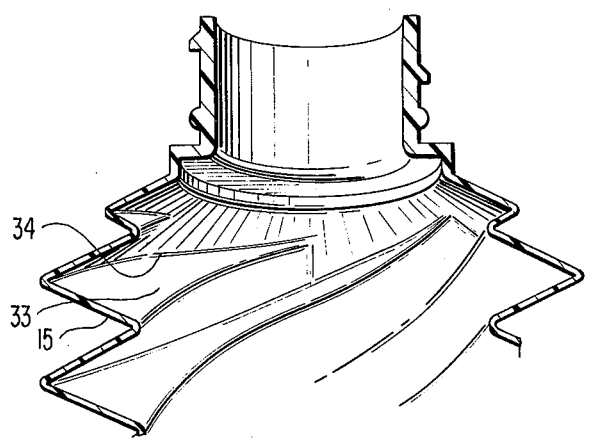
FIG. 6
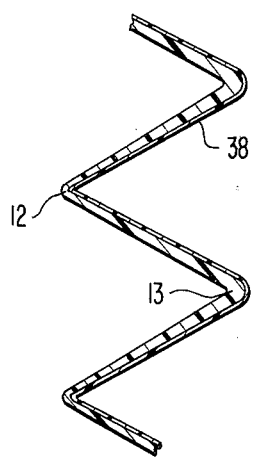
FIG. 5
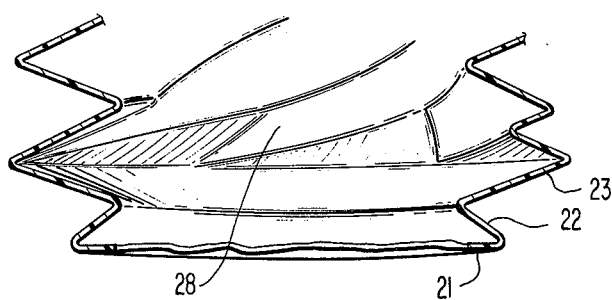
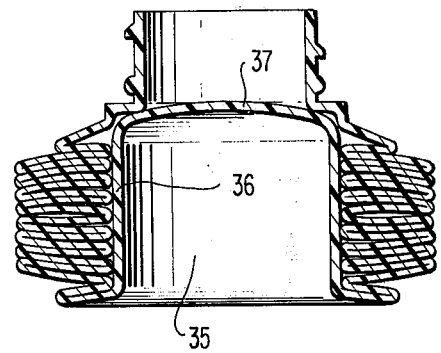
FIG. 7

COLLAPSIBLE, SPIRALLY FLUTED CONTAINER

A method and apparatus for making the container is disclosed in my copending application, Ser. No. 167,715 filed July 30, 1971, now U.S. Pat. No. 3,819,789 issued June 25, 1974 of which this case is a continuation in part. U.S. Pat. No. 3,819,789 is itself a continuation in part of abandoned application Ser. No. 832,257 filed June 11, 1969.

BACKGROUND OF THE INVENTION

My prior U.S. Pat. Nos. 2,723,779 and 2,899,110 show plastic dispensing containers having spiral flutes.

It is the object of this invention to provide an improved container of this general type which can be cheaply made as an integral product by blow molding, which will be easy to use, will efficiently dispense its entire contents and will be attractive in appearance.

SUMMARY OF THE INVENTION

The container of the invention is an integral blow molded structure made of any suitable material to be flexible and resilient, the material preferably being a plastic and specifically polyethylene.

The container is particularly designed for dispensing viscous material, such as mayonnaise, peanut butter, sandwich spreads, cheeses, and the like, but obviously it is adapted to dispense any flowable material.

The principal characteristics of the container are the plural spiral longitudinal flutes on the walls of the container which act to mechanically thrust the contents of the container out of its dispensing opening when the container is collapsed with a twisting motion, which may be caused by a simple longitudinal force. The flutes have a spiral angle of about 30° and are so arranged as to efficiently cause the material to flow from the base of the container to the dispensing opening. An integrally formed expeller acts to substantially completely empty the container when in fully collapsed condition.

BRIEF DESCRIPTION OF THE DRAWING

FIG. 1 is a side elevation of a container.
FIG. 2 is a top plan view of the container.
FIG. 3 is a section on line 3—3 of FIG. 1.
FIG. 4 is a cut away perspective view of the inside of the top part of the container.
FIG. 5 is a cut away perspective view of the inside of the bottom part of the container, the impeller being cut away.
FIG. 6 is a fragmentary section of the container wall showing a lining.
FIG. 7 is a view similar to FIG. 3 but showing the container collapsed.

DETAILED DESCRIPTION OF THE PREFERRED EMBODIMENT

The container 1 has a base 2, a top conical shoulder portion 3 and a body portion 4 extending between the base 2 and shoulder 3. Extending upwardly from shoulder 3 is a dispensing neck 4 having a relatively wide inside diameter and forming a dispensing outlet conduit 5. The outside of neck 4 has threads 6 and an annular stop 7 for cooperation with threads on a cap 8 shown in dotted lines.

The wall 9 of body portion 4 is formed with six or more external spiral flutes or channels 10 and six or more internal spiral flutes or channels 11. The contiguous flutes have outer apices 12, inner apices 13, upwardly and inwardly sloping walls 14 and upwardly and outwardly sloping walls 15. Thus each external spiral flute comprises a wall 14 and 15 meeting at an inner apex 13 and each internal flute comprises a wall 14 and 15 meeting at an outer apex 12.

The external apices 12 start from points 16 at shoulder 3 and end at points 17 in base 2 such that in plan view each apex makes approximately one complete circle. Thus each flute or channel also makes approximately one complete turn or circle in plan view.

The slope of the apices and flutes is such that the spiral angle S which an apex makes with the horizontal is about 30°. In other words, a line 18 drawn tangent to an apex at any point in the main body portion 4 makes an angle S with a horizontal surface 19 which is approximately 30°.

While the angle S is preferably 30°, such is not absolutely necessary and satisfactory performance may be had with angles varying from 25° to 35°.

The width W of each of the external and internal flutes, measured perpendicular to the line 18, is approximately equal for all of the flutes and is constant in the main portion of the flutes between those locations where the walls of the flutes intersect the top shoulder 3 and base 2 and the flutes may change character as they merge into the shoulder and the base.

The depth D of each of the internal and external flutes is approximately equal for all of the flutes and is constant for the main portions of the flutes between locations where they merge into the shoulder 3 and base 2.

The angle B and angle C made by the intersection of walls 14, 15 with the horizontal plane 20 between the locations where the flutes merge with the shoulder 3 and base 2 is each approximately 30°. The angles B and C are formed by the intersections of a vertical plane with the walls 14 and 15 and with a horizontal plane 20.

The base 2 has an annular support portion 21, a conical upwardly and inwardly sloping part 22, a conical upwardly and outwardly sloping part 23 and a final conical upwardly and inwardly sloping part 24. Parts 22 and 23 form an external annular, horizontal groove 25. The groove 25 is particularly useful during the filling of the container. As part of the filling operation, the container is guided during conveying movement by rods which engage the groove 25 at opposite sides.

Wall 14 of each flute intersects conical part 24 at a curved line 26 and wall 15 of each flute intersects conical part 24 at a curved line 27. Thus a portion 28 of part 24 between lines 26 and 27 forms a terminal portion of each interior flute 11 to guide material in the container at the base into the unobstructed flutes or channels.

The top annular shoulder 3 forms an annular conical surface sloping upwards and inwards towards the neck 4. As the external apices 12 approach the shoulder 3 they turn spirally inwardly at points 29 so that the points 30 of the conical surface where the apices 12 start to merge with the surface are spaced radially inwardly a small amount from the points 29 on the outer circumference of apices 12, as seen in plan view in FIG. 2. Apices 12 also extend spirally upwardly and radially inwardly as they intersect the conical surface of shoulder 3 along spiral lines 31 from points 30 to points 32 which are radially inward of points 30 and radially outward of neck 4. Thus the internal flutes or channels 11 are directed upwardly and also radially inwardly towards the dispensing conduit 5. As seen in FIG. 4 the tapering top terminal portion 33 of a flute or channel 11 is composed of a wall 15 and the inner conical surface 34 of shoulder 3 between points 30 and 32, both of the walls of this portion of the flute being directed upwardly and inwardly towards the central conduit 5.

Extending upwardly from annular support portion 21 is an expeller or inward protuberance 35. The expeller 35 has a cylindrical portion 36 whose outer wall makes sliding contact with apices 13 when the container is collapsed as shown in FIG. 7. The top of the expeller 35 is a convex top wall 37 which fits against the top of the container as shown in FIG. 7 when the container is collapsed. Thus, the expeller 35 in combination with the collapsible flutes acts to dispense substantially all the container contents.

Since polyethylene, the preferred material of which the container is made, is permeable to oxygen, it is desirable to use an impermeable liner when dispensing certain meterials. For example, an impermeable liner is desirable for use in dispensing foodstuffs to prevent change in their quality and taste as well as other materials which have a fragrance or flavor which needs to be maintained in its original packaged condition until completely used. A preferred liner is Saran, a vinyl chloride-vinylidene chloride copolymer. A coating 38 of Saran 40 is placed on the interior of the container by pouring into the container a liquid formulation of Saran and then pouring it out as it cools. The flutes of the wall of the container aid materially in maintaining the Saran in adherence to the container wall since they impede flow.

The dimensional relationships of the various parts of the container are important in achieving satisfactory dispensing operation having in mind the material to be dispensed. The bottle illustrated is particularly designed to dispense a viscous material. The overall height of the bottle is about 4 7/32 inches, the length of the neck is about 21/32 of an inch, the length of the flute portion is about 3 1/16 inches, the overall width is about 2 ¼ inches, the diameter of dispensing conduit 5 is about 1 1/16 inches, the diameter of the lowest part of the base is about 1 26/32 inches, the width W of a flute is about 13/32 of an inch, the depth D of a flute is about 10/32 of an inch, and the breadth of a wall of a flute is about 13/32 of an inch. The wall thickness of the flutes averages about 1/32 of an inch and is considerably thicker at the inner apices 13 than at the outer apices 12. This variation in thickness of the walls and apices of the flutes or channels is illustrated in FIG. 6. The other FIGS. are more schematic in nature.

The number of the flutes may vary from 5 through 9 and the width and depth of the flutes may vary widely depending on the kind of material dispensed and the size of the container. The angles C and B may vary to some extent and need not be equal, but 30° has been found to be very satisfactory.

The slope angle S of the spirals is the most important characteristic for satisfactory dispensing with the proper amount of twisting motion during longitudinal collapse of the container. As stated before, the preferred angle is 30° and the angle should be in the range of 25° through 35°.

In use, the container may be collapsed to the condition shown in FIG. 7 by merely squeezing it between the fingers and thumb of one's hand applied to shoulder 3 and base 2. It will be noted that in the collapsed condition, the flutes assume a cup shape with the lower portion of the flutes cupped up and the upper portion of the flutes cupped down. Pressure thus applied along the longitudinal axis will cause the wall of the container to twist and collapse the flutes. Of course, alternatively in a larger container, it may be collapsed by an applied twisting motion, but generally it is more convenient in small containers to cause collapse by a simple axial pressure, the base of the container twisting while in contact with the thumb.

As the flutes collapse, the material in flutes 11 is mechanically thrust spirally upwardly and at the top part of the flutes also inwardly towards neck 4, as previously described, thus causing a smooth unobstructed flow of material into dispensing conduit 5. Expeller 35 also mechanically thrusts out the material in the center of the container.

The described container is particularly well suited to the dispensing of viscous materials such as cold cream, toothpaste, peanut butter, processed cheese or the like. When used with such contents the resilience of the container is such that after partial collapse to dispense some of the contents, the container does not return to its original shape. The material climbs the spiral flutes and is retained at any particular elevation by the apices of the flutes. This is a desirable feature since it prevents air from being sucked into the container. If after partially dispensing cold cream, for example, air were sucked into the container, on a subsequent dispensing the air would mix with the contents and the smooth, uniform character of the cold cream would be marred on subsequent dispensing.

Obviously, the container may be used to dispense many other materials than those named, for example, greases, caulking compounds, and pharmaceuticals. The container may also serve as a discardable carrier for a hypodermic needle, or for aerosols. In short, the possible uses are extremely numerous.

What is claimed is:

1. An integral container for dispensing viscous material, said container being made of yieldable material and comprising a top shoulder portion having a dispensing opening, a base portion and a body portion extending between said shoulder and said base portion, a plurality of contiguous external channels and contiguous internal channels in the wall of the body portion, each channel extending spirally and continuously from the shoulder portion to the base portion, each of said channels having a spiral slope angle in the range of 25° through 35°, said spirally extending channels causing said container to collapse with a twisting motion to mechanically thrust the contents of the container out of the dispensing opening when the container is subjected to a compressing force directed along its longitudinal axis, said container assuming a distended position when empty of contents and the resilience of the material of which the container is made being such that when the container is partially collapsed to dispense some of its contents through the dispensing opening the container remains in the position to which it was collapsed even though the dispensing opening is unobstructed, thus preventing air from being sucked into the container.

2. An integral container made of yieldable material comprising a top shoulder portion having a dispensing opening, a base portion and a body portion extending between said shoulder portion and said base portion, a plurality of contiguous external channels and contiguous internal channels in the wall of the body portion, each channel extending spirally and continuously from the shoulder portion to the base portion, each of said channels having a spiral slope angle in the range of 25° through 35°, said spirally extending channels causing said container to collapse with a twisting motion to mechanically thrust the contents of the container out of the dispensing opening when the container is subjected to a compressive force directed along its longitudinal axis, each of said channels comprising a longitudinally extending apex and longitudinally extending side walls, said top shoulder portion having a conical upwardly and inwardly sloping surface and the channels merging into said surface so as to form tapering continuation internal channels in said surface, the apex of said tapering continuation internal channels extending longitudinally inwardly as well as spirally upwardly and the top shoulder portion forming one wall of each of said tapering continuation internal channels, said tapering continuation internal channels presenting unobstructed passages toward said dispensing opening.

3. A container as claimed in claim 2 wherein each of said channels extends at a constant radius to the longitudinal axis of the container from the base portion to a point near the top sloping shoulder portion but beyond the limits of said top portion and then extends radially and spirally inwardly from said point as it merges into said sloping shoulder portion.

4. A container as claimed in claim 2 wherein the base portion comprises an inwardly and upwardly sloping conical surface and the channels merge with said surface to present unobstructed passages for the entrance of material into said flutes.

* * * * *